Aug. 7, 1923.  1,464,471
B. E. GETZ
DRIVING MECHANISM FOR WASHING MACHINES
Filed Nov. 14, 1921
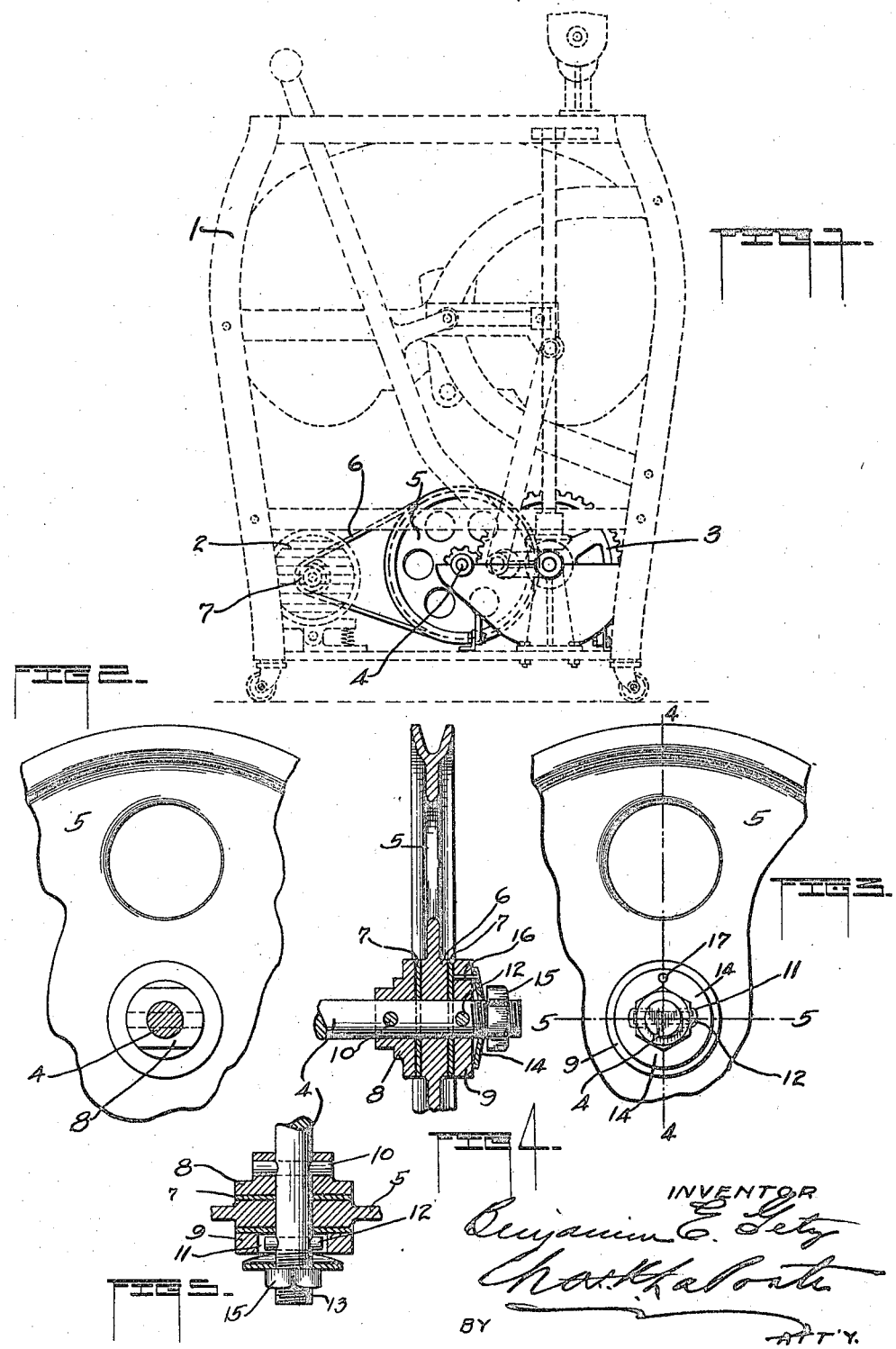
INVENTOR
Benjamin E. Getz
BY
ATT'Y.

Patented Aug. 7, 1923.

1,464,471

UNITED STATES PATENT OFFICE.

BENJAMIN E. GETZ, OF MORTON, ILLINOIS.

DRIVING MECHANISM FOR WASHING MACHINES.

Application filed November 14, 1921. Serial No. 514,863.

*To all whom it may concern:*

Be it known that I, BENJAMIN E. GETZ, a citizen of the United States, a resident of Morton, in the county of Tazewell and State of Illinois, have invented new and useful Improvements in Driving Mechanism for Washing Machines, of which the following is a specification.

This invention has reference to new and useful improvements in driving mechanism for washing machines, particularly such machines as are power operated and where electric motors are employed as the power plant.

The invention has for its principal object to provide a means for preventing the stripping or breaking of gears in the transmission; shearing off of pins securing the gearing to their shafts; the breaking of the driving belt between motor and pulley wheel on the driving shaft, or other sensitive parts, in the event of a stalling of the movement of the clothes retainer by reason of overload, or the stoppage, clogging or retarding of the washing elements, which would place undue strain on the transmission, including the driving belt, and which would result in the breaking of any of such parts before the attendant could shut off the power or stop the machine.

That the invention may be more fully understood, reference is had to the accompanying drawings forming a part of the description illustrating a preferred embodiment of the invention, in which:—

Figure 1 is a side elevation, in outline, of one form of washing machine with my invention applied thereto;

Figure 2 is a partial side elevation looking at one side of a pulley wheel driven from the motor and employed to transmit motion to the washing elements;

Figure 3 is a partial side elevation looking at the other side of said pulley wheel;

Figure 4 is a vertical sectional view, as the same would appear, if taken on the line 4—4 Figure 3, and Figure 5 is a cross-section, in plan, as the same would appear, if taken on the line 5—5 Figure 3.

Like characters of reference denote corresponding parts throughout the figures.

The invention herein, is shown applied to the pulley wheel and driving shaft, which receive their power from an electric motor, and transmit motion to the power transmission and washing and wringing elements.

I am not concerned with the particular kind of washing machine, its washing or wringing elements, as they may be of any preferred or desirable construction; and in the present drawing 1 designates generally one conventional form of domestic washing machine, the washing and wringing elements of which are power driven thru suitable operating mechanism actuated from an electric motor 2, mounted or supported on the platform or bed of the machine.

The transmission of machines of this character include gearing 3 operated from a driving shaft 4 having a pulley 5 driven by a belt 6 off of a pulley wheel 7 connected to the motor 2. Ordinarily in machines of this character, unless the driving shaft is direct driven, it has usually keyed thereto the pulley wheel 7, and thus it will be seen that if there is any retarding of action of the washing or wringing elements, such as would put an undue strain on the belt 6 or the transmission gearing, one or the other, or possibly both are liable to break, unless the attendant is at hand to shut off the power or stop the machine.

In the present instance the wheel 5 has a hub 6 to receive the shaft 4. Washers 7 which are preferably fiber lie in juxtaposition to the hub and on either side thereof, and 8 and 9 designate collars which have a bearing relation against said washers. The collar 8 being preferably pinned to the shaft 4 by the pin 10, and the collar 9 having a central slot 11 forming a seat for a pin 12 to prevent turning of the collar, except with the shaft 4. The end of the shaft is threaded, as at 13.

The collars 8 and 9, the washers 7 and the wheel 5 having been placed on the shaft 4 in the relation shown, in Figures 4 and 5, there is slipped onto the shaft, the spring bearing washer 14, contacting at preferably diametric points with the collar 9, and a nut 15 screwed onto the threaded end of the shaft and caused to bear against and push the collar 9 so as to bring about a frictional locking relation between the collars 8 and 9 and the washers 7 and the pulley wheel 5, whereby the latter will turn the shaft 4 when the belt 6 is actuated from the motor 2. I preferably pin the washer 14 to the collar 9, by a pin 16 secured in the collar 9 and entering a perforation 17 in the washer 14. This prevents the washer 14 turning as the nut 15 bears frictionally there-against as it is screwed up and insures the contact points of the washer 14 bearing with sufficient force, under pressure of the nut 15, to frictionally lock the pulley wheel 5 between the parts bearing there-against, on either side. While the pulley wheel is frictionally locked to the shaft 4 in a manner to insure the operation of said shaft to transmit power, and for all practical purposes, under undue strain for any reason whatever, the wheel could free itself and rotate on the shaft without danger of stripping gears or breaking the belt.

In domestic washing machines, where, in most cases they are used by help, usually not trained and far from being skilled, the machines must be so constructed as to be almost "fool proof." And again, the breakage of parts must be reduced to a minimum, not only to reduce the operating expense and maintenance but to avoid delays in the use of the machines where help is employed by the hour or by the day. The within described improvement while simple and inexpensive serves a most useful purpose and adds greatly to belt operated machines.

What I claim is:—

In a machine of the character described, in combination, a driving shaft having a threaded end, a wheel loosely carried thereon, collars on either side of the hub of said wheel rotatable with said shaft, fiber washers between said collars and the hub of said wheel, a spring washer having diametric contact points with one of said collars, and a nut arranged to be screwed onto the threaded end of said shaft for moving said spring washer and causing a frictional locking relation between the collars and said wheel.

In witness whereof, I have hereunto affixed my hand and seal this 10th day of November, 1921.

BENJAMIN E. GETZ.